(No Model.)
A. E. BARTHEL.
COMBINATION LUBRICATOR.
No. 304,289. Patented Sept. 2, 1884.
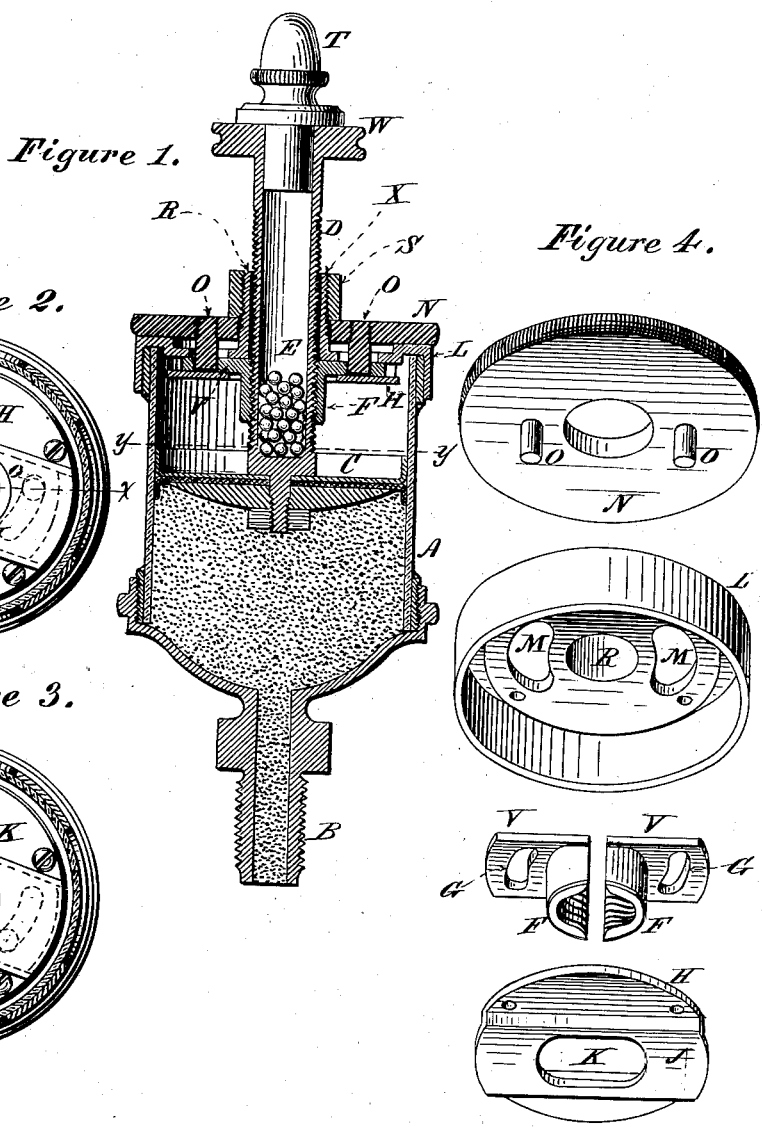

UNITED STATES PATENT OFFICE.

A. EDWARD BARTHEL, OF NEW YORK, N. Y.

COMBINATION-LUBRICATOR.

SPECIFICATION forming part of Letters Patent No. 304,289, dated September 2, 1884.

Application filed January 14, 1884. (No model.)

*To all whom it may concern:*

Be it known that I, A. EDWARD BARTHEL, of the city, county, and State of New York, have invented a new and useful Improvement in Combination-Lubricators, of which the following is a full, true, and exact description, reference being had to the accompanying drawings.

Heretofore lubricators for automatically supplying to journals or other mechanism a suitable solid or semi-solid lubricant have been of two classes, in one of which the grease or lubricant was at all times fed by the action of gravity by means of a follower or piston continually pressing upon it. In the other class such follower or piston was not free to fall by gravity, but was fed down upon the lubricant by turning a screw or similar mechanism at intervals. Both of these mechanisms have their advantages, and it is sometimes advisable upon the same bearing to use one method, while at other times it is advisable to use the other method, of supplying such lubricant.

My invention consists in providing a simple and efficacious device for feeding the lubricant, which, by a simple motion or by a ready alteration of some mechanism, can be changed from an automatic lubricator in which the grease is continually supplied by gravity to a screw-lubricator in which the grease is forced outward by the action of a screw. By this mechanism, therefore, the engineer can either continually supply the lubricant, or need supply it only at intervals, as he may deem proper. By my device likewise, as will be hereinafter seen, the apparatus can be much more readily resupplied with the grease or lubricant than is true of the screw-lubricator, because the piston can be readily and quickly raised, instead of gradually screwing it up to its upper position. The apparatus which I here show is only one of many forms in which my invention can be embodied, and I describe it merely as the best form known to me, but not as indicating the only method in which the invention may be carried out.

In my drawings similar letters refer to similar parts.

Figure 1 represents a view, generally in section, of my entire apparatus, being in part a section through Fig. 2 on the line *x x*. Figs. 2 and 3 represent sectional views beneath the stem-controlling mechanism, showing the locking device in two positions, the section being taken on the line *y y*, Fig. 1. Fig. 4 represents the details of this locking mechanism.

A represents, generally, the casing or cup of the lubricator, which may be connected to the journal or bearing by the screw-thread B, and this cup may be partly or wholly of glass, as desired, or may be of metal. I prefer, however, to have certain glass partitions in it, by means of which the amount of lubricant may be observed. Within this cylindrical cup is fitted the piston C, which should preferably be packed with a suitable leather or equivalent packing. By the depression of this piston the lubricant is forced out through the discharge-opening in the connection B. This piston is provided with a stem, D, by means of which it may be raised and lowered, which stem is provided with a screw-thread, as shown. The stem is preferably made hollow, and with a cover, T, by means of which shot E may be placed within it, thereby altering its gravity. This construction is, however, a matter of detail.

The cover of my cylindrical lubricator-cup is shown at L. This cover has a lip adapted to fit closely on the outside of the cup, and may be screwed or cemented there, if desired. It is also provided with a tubular or cylindrical extension, R, extending above it and serving as a guide for the rod D under certain circumstances. This cover L is likewise provided with circumferential slots M, allowing the passage of controlling-pins O O, hereinafter to be described.

Beneath the cover L is screwed or suitably fastened the channel-plate H, provided with the supporting-channel J. Through the center of this channel J is cut the oblong slot K, allowing the passage of the locking-nuts F F. These nuts constitute a divided nut, and are provided with plates V V, adapted to slide and be supported in the channel J. The half-nuts F F form part of these plates V V. The plates V V are likewise provided with the eccentric slots G G. When the plate H is screwed in position beneath the cover L, it will be seen that the slots G G come under the slots M M, while the central openings, R and K, and the opening between the nuts F F likewise correspond.

The controlling-plate N is placed upon the plate L when the apparatus is put together. This plate N is preferably provided with a milled edge, whereby it may be readily manipulated, and it is likewise provided with pins O O, which engage with the eccentric slots G G. The plate N may be rotated by hand, and within the arc permitted by the slots G G, and such rotation will close or open the split nut F F, depending upon the position of the pins O O in the eccentric slots G G. The tubular extension R is provided with a screw-thread, X, on its outer surface, upon which the nut S may be screwed. When the parts are put in position, the nut S is screwed down upon the plate N, thereby preventing its withdrawal, but permitting its rotation. The stem D having been arranged within the central openings of the parts N, L, V V, and H, these parts are put together, as described. It will now be seen that when the plate N is rotated to the left the split nut F F will be opened and the apparatus will be in the position shown in Fig. 3. In this position the stem D will slide vertically, being fast upon the piston C below, and being supported in the guide R above. If, however, the plate N be turned to the right, the apparatus will be in the condition shown in Figs. 1 and 2, when the split nut will engage with the screw-thread on the stem D. In this position the piston can only be raised or lowered by turning the stem D by the handle W, while the reverse motion of the plate N will again free the stem and piston and allow the same to fall by gravity, or be raised by the hand of the engineer.

It will be observed that the principle of my invention is in the use of a mechanism which will at times clasp the stem connected with the piston and at other times release the same, and that the mechanism which I preferably employ for this purpose is a split nut. It will be obvious that this nut may be made in three or more sections, instead of in two sections. Under certain circumstances only one side of it need be employed; but I prefer to have a screw-thread upon both sides of the central stem. It will be plain, likewise, that the cup might be of different shapes. I regard the tubular guide in the cover as also of importance, as it prevents the jamming of the thread, which might otherwise occur.

In filling this lubricator, which may be done either from the upper or lower end, although I prefer to fill it from the lower end, the piston may be readily drawn to the upper end of the cup by freeing the nut, and then held in that position by clamping it, and when the lubricating-cup is in position the piston may be again released, if desired. By this means I prevent the loss of time, which would otherwise occur by raising the piston, by turning the screw until it had reached the upper end of its traverse.

What I claim as my invention, and desire to secure by Letters Patent, is—

1. The combination, in a lubricator consisting of a casing or cup having a discharge-opening, of a piston or follower, and mechanism, substantially as described, whereby the said piston may be permitted to feed the lubricant by gravity, or may be screwed down upon the lubricant at the will of the operator, substantially as described.

2. The combination, in a lubricator, of a piston or follower for forcing out the lubricant, of a stem connected therewith, and of mechanism, substantially as described, whereby a screw-thread upon the said stem may be clasped, or whereby said stem may be freed and allowed to fall by gravity at the will of the operator, substantially as described.

3. The combination, in a lubricator, of a piston or follower, a threaded stem connected therewith, a split nut, and mechanism, substantially as described, whereby said nut may be caused to engage with the thread of the stem or withdrawn therefrom at the will of the operator, substantially as described.

4. The split nut and a guiding-tube combined in a lubricator, with the screw-stem, case, and piston, to prevent the jamming of the thread, substantially as described.

5. The combination, in a cylindrical lubricator, of a piston or follower, a stem connected therewith, and mechanism, as described, whereby the said piston may be fed forward by a screw-thread, or may be freely moved with its support at the will of the operator, substantially as described.

6. The combination of the lubricator-cup A, piston C, the threaded stem D, split nut F F, provided with eccentric slots G G, cover L, and the controlling-pins O O, substantially as described.

7. The combination, in a lubricator, of the piston C, the threaded stem D, the divided nut F F, controlled by eccentric slots G G, the cover L, supporting said divided nut, and the plate N, provided with pins O O, for moving said divided nut, substantially as described.

8. The combination, in a lubricator, of a cup, A, a follower, C, a threaded stem, D, a split nut, F F, and mechanism, as described, for opening and closing the same, and the tubular guide R, substantially as described.

A. EDWARD BARTHEL.

Witnesses:
GEO. H. EVANS,
WM. A. POLLOCK.